(12) United States Patent
Filgas et al.

(10) Patent No.: US 10,056,731 B2
(45) Date of Patent: Aug. 21, 2018

(54) PLANAR WAVEGUIDE (PWG) AMPLIFIER-BASED LASER SYSTEM WITH ADAPTIVE OPTIC WAVEFRONT CORRECTION IN LOW-POWER BEAM PATH

(71) Applicant: Raytheon Company, Waltham, MA (US)

(72) Inventors: David M. Filgas, Newbury Park, CA (US); Brian F. Boland, Redondo Beach, CA (US); Andrew D. W. McKie, Northborough, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/246,076

(22) Filed: Aug. 24, 2016

(65) Prior Publication Data

US 2018/0212393 A1    Jul. 26, 2018

Related U.S. Application Data

(60) Provisional application No. 62/259,722, filed on Nov. 25, 2015, provisional application No. 62/266,507, filed on Dec. 11, 2015.

(51) Int. Cl.
*H01S 3/10* (2006.01)
*H01S 3/063* (2006.01)
(Continued)

(52) U.S. Cl.
CPC ........ *H01S 3/10015* (2013.01); *H01S 3/0014* (2013.01); *H01S 3/0632* (2013.01); *H01S 3/08072* (2013.01); *H01S 3/1305* (2013.01)

(58) Field of Classification Search
CPC .. H01S 3/10015; H01S 3/0014; H01S 3/0632; H01S 3/08072; H01S 3/1305
See application file for complete search history.

(56) References Cited

U.S. PATENT DOCUMENTS

| 5,105,430 A | 4/1992 | Mundinger et al. |
| 5,363,391 A | 11/1994 | Matthews et al. |

(Continued)

FOREIGN PATENT DOCUMENTS

| WO | 0161799 A2 | 8/2001 |
| WO | 2008133648 A2 | 11/2008 |

OTHER PUBLICATIONS

International Search Report and Written Opinion of International Searching Authority dated Feb. 5, 2016 in connection with International Application No. PCT/US2015/055014, 8 pgs.

(Continued)

*Primary Examiner* — Armando Rodriguez (57) ABSTRACT

A system includes a master oscillator configured to generate a low-power optical beam. The system also includes a planar waveguide (PWG) amplifier configured to amplify the low-power beam into a high-power output optical beam, where the PWG amplifier has a larger dimension in an unguided direction and a smaller dimension in a transverse guided direction. The system further includes an adaptive optic configured to pre-distort the low-power optical beam substantially along a single dimension prior to injection of the low-power optical beam into the PWG amplifier in order to compensate for thermal-based distortions created by the PWG amplifier. The single dimension represents the unguided direction. In addition, the system includes a feedback loop configured to control the adaptive optic.

22 Claims, 7 Drawing Sheets

(51) Int. Cl.
  *H01S 3/08*  (2006.01)
  *H01S 3/13*  (2006.01)
  *H01S 3/00*  (2006.01)

(56) References Cited

U.S. PATENT DOCUMENTS

| | | | |
|---|---|---|---|
| 5,398,130 | A | 3/1995 | Redman |
| 6,160,824 | A | 12/2000 | Meissner et al. |
| 6,690,696 | B2 | 2/2004 | Byren et al. |
| 6,738,396 | B2 | 5/2004 | Filgas et al. |
| 6,809,307 | B2 | 10/2004 | Byron et al. |
| 6,810,060 | B2 | 10/2004 | Vetrovec |
| 6,859,472 | B2 | 2/2005 | Betin et al. |
| 6,937,629 | B2 | 8/2005 | Perry et al. |
| 7,065,121 | B2 | 6/2006 | Filgas et al. |
| 7,472,741 | B2 | 1/2009 | Johnson et al. |
| 7,983,312 | B2 | 7/2011 | Shkunov et al. |
| 8,565,272 | B2 | 10/2013 | Shkunov et al. |
| 8,731,013 | B2 | 5/2014 | Byren et al. |
| 8,787,768 | B2 | 7/2014 | Klotz et al. |
| 8,977,097 | B2 | 3/2015 | Filgas |
| 9,014,226 | B2 | 4/2015 | Perin |
| 2002/0110166 | A1 | 8/2002 | Filgas |
| 2004/0028094 | A1 | 2/2004 | Betin et al. |
| 2006/0108098 | A1 | 5/2006 | Stevanovic et al. |
| 2008/0069160 | A1 | 3/2008 | Stephens, IV |
| 2008/0095204 | A1 | 4/2008 | Miyajima et al. |
| 2010/0078577 | A1 | 4/2010 | Moriya et al. |
| 2012/0103569 | A1 | 5/2012 | Kim |
| 2013/0294468 | A1* | 11/2013 | Sridharan ............ H01S 3/10007 372/29.02 |
| 2014/0268309 | A1 | 9/2014 | Strohkendi |
| 2015/0378093 | A1 | 12/2015 | Murgal |
| 2016/0047981 | A1 | 2/2016 | Filgas et al. |
| 2016/0047982 | A1 | 2/2016 | Filgas |

OTHER PUBLICATIONS

Pearson et al., Applied Optics and Optical Engineering, edited by R. Shannon and J. Wyant, vol. VII, Chapter 8, "Adaptive Techniques for Wave-Front Correction", 1979, pp. 259-264.

P. McManamon et al., "Review of Phased Array Steering for Narrow-Band Electrooptical Systems", Proceedings of the IEEE, vol. 97, No. 6, Jun. 2009, pp. 1078-1096.

Filgas et al., "System and Method for Cooling a Laser Gain Medium Using an Ultra-Thin Liquid Thermal Optical Interface", U.S. Appl. No. 14/661,828, filed Mar. 18, 2015, 25 pgs.

Zamudio et al., "Techniques for Forming Waveguides for Use in Laser Systems or Other Systems and Associated Devices", U.S. Appl. No. 14/845,916, filed Sep. 4, 2015, 26 pgs.

Filgas et al., "High-Power Planar Waveguide (PWG) Pumphead With Modular Components for High-Power Laser System", U.S. Appl. No. 15/233,238, filed Aug. 10, 2016, 77 pgs.

Filgas et al., "High-Gain Single Planar Waveguide (PWG) Amplifier Laser System", U.S. Appl. No. 15/233,913, filed Aug. 10, 2016, 77 pgs.

Filgas et al., "Dual-Function Optical Bench and Cooling Manifold for High-Power Laser System", U.S. Appl. No. 15/233,928, filed Aug. 10, 2016, 80 pgs.

McGanty et al., "Planar Waveguides With Enhanced Support and/or Cooling Features for High-Power Laser Systems", U.S. Appl. No. 15/041,909, filed Feb. 11, 2016, 38 pgs.

Filgas et al., "Integrated Pumplight Homogenizer and Signal Injector for High-Power Laser System", U.S. Appl. No. 15/233,303, filed Aug. 10, 2016, 81 pgs.

Filgas, et al., "Dual-Axis Adaptive Optic (AO) System for High-Power Lasers", U.S. Appl. No. 15/174,369, 34 pages.

The International Searching Authority, "Notification of Transmittal of the International Search Report and the Written Opinion of the International Searching Authority, or the Declaration," International Application No. PCT/US2016/054252, Nov. 24, 2016, 12 pages, publisher EPO, Rijswijk, Netherlands.

* cited by examiner

PLANAR WAVEGUIDE (PWG) AMPLIFIER-BASED LASER SYSTEM WITH ADAPTIVE OPTIC WAVEFRONT CORRECTION IN LOW-POWER BEAM PATH

CROSS-REFERENCE TO RELATED APPLICATION AND PRIORITY CLAIM

This application claims priority under 35 U.S.C. § 119(e) to:

U.S. Provisional Patent Application No. 62/259,722 filed on Nov. 25, 2015; and

U.S. Provisional Patent Application No. 62/266,507 filed on Dec. 11, 2015.

Both of these provisional applications are hereby incorporated by reference in their entirety.

TECHNICAL FIELD

This disclosure is generally directed to high-power laser systems. More specifically, this disclosure is directed to a planar waveguide (PWG) amplifier-based laser system with adaptive optic wavefront correction in a low-power beam path.

BACKGROUND

High-power laser systems are being developed for a number of military and commercial applications. However, solid-state lasers that operate at relatively high average powers may exhibit degraded beam qualities due to thermally-induced aberrations such as thermal lensing. Thermally-induced aberrations are produced by transient or steady-state thermal gradients in a laser gain medium during operation and can be complex when the laser gain medium is heated or cooled non-uniformly. This can be especially problematic for laser gain media that have a high change in refractive index with temperature.

SUMMARY

This disclosure provides a planar waveguide (PWG) amplifier-based laser system with adaptive optic wavefront correction in a low-power beam path.

In a first embodiment, a system includes a master oscillator configured to generate a low-power optical beam. The system also includes a PWG amplifier configured to amplify the low-power beam into a high-power output optical beam, where the PWG amplifier has a larger dimension in an unguided direction (a slow axis direction) and a smaller dimension in a transverse guided direction (a fast axis direction). The system further includes an adaptive optic configured to pre-distort the low-power optical beam substantially along a single dimension prior to injection of the low-power optical beam into the PWG amplifier in order to compensate for thermal-based distortions created by the PWG amplifier. The single dimension represents the unguided direction. In addition, the system includes a feedback loop configured to control the adaptive optic.

In a second embodiment, a method incudes generating a low-power optical beam using a master oscillator. The method also includes amplifying the low-power optical beam to generate a high-power output optical beam using a PWG amplifier, where the PWG amplifier has a larger dimension in an unguided direction and a smaller dimension in a transverse guided direction. The method further includes controlling an adaptive optic using a feedback loop to pre-distort the low-power optical beam substantially along a single dimension prior to injection of the low-power optical beam into the PWG amplifier in order to compensate for thermal-based distortions created by the PWG amplifier. The single dimension represents the unguided direction.

In a third embodiment, an apparatus includes at least one interface configured to receive measurements of samples of a high-power output optical beam generated by a PWG amplifier amplifying a low-power optical beam from a master oscillator. The PWG amplifier has a larger dimension in an unguided direction and a smaller dimension in a transverse guided direction. The apparatus also includes at least one processing device configured to control an adaptive optic located in an optical path of the low-power optical beam between the master oscillator and the PWG amplifier using the measurements. The at least one processing device is configured to determine how to adjust the adaptive optic in order to pre-distort the low-power optical beam substantially along a single dimension prior to injection of the low-power optical beam into the PWG amplifier in order to compensate for thermal-based distortions created by the PWG amplifier. The single dimension represents the unguided direction.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
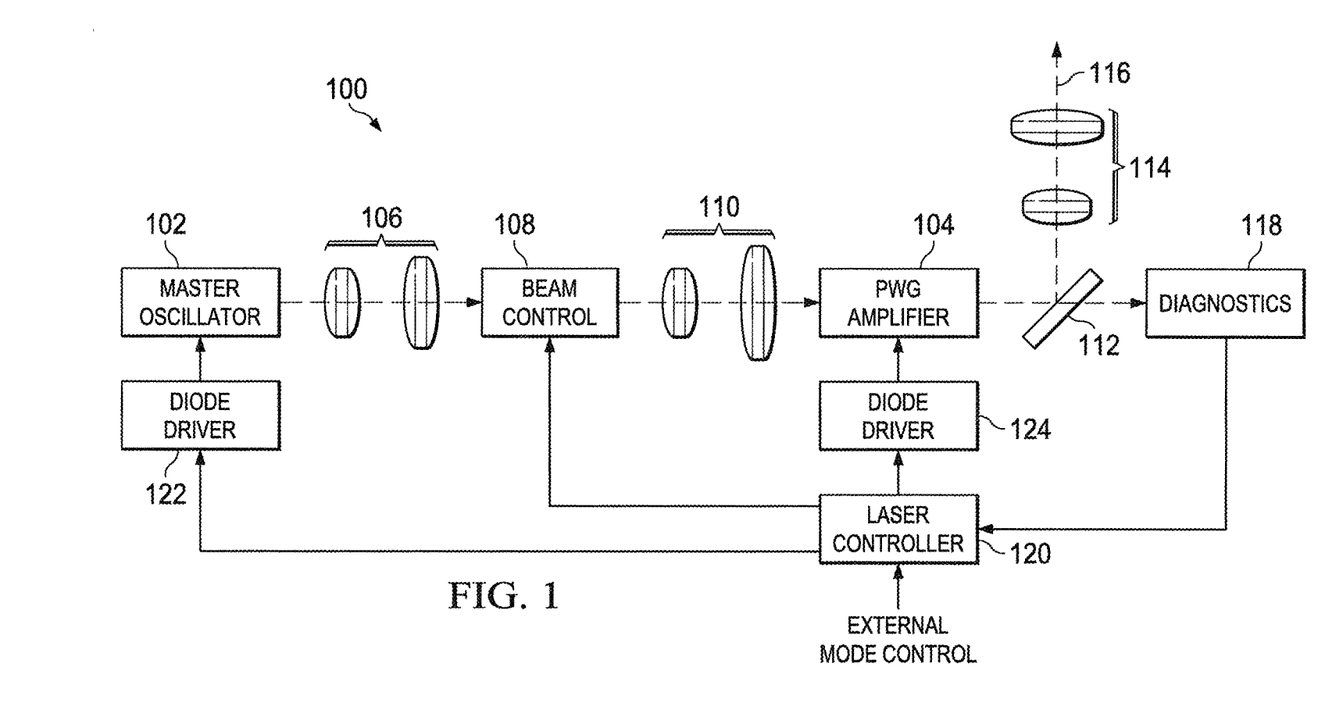
FIG. 1 illustrates an example high-power laser system according to this disclosure.

FIG. 1 illustrates an example high-power laser system 100 according to this disclosure. As shown in FIG. 1, the laser system 100 includes a master oscillator 102 and a planar waveguide (PWG) amplifier 104. The laser system 100 therefore has a master oscillator/power amplifier (MOPA) configuration.

The master oscillator 102 generally operates to generate low-power optical signals. The low-power optical signals could denote any suitable optical signals having relatively low power. For example, the low-power optical signals could include optical signals having a continuous wave (CW) output, a continuous pulse train (CPT), a pulse burst, or any of various other waveforms. The master oscillator 102 includes any suitable structure(s) for generating one or more low-power optical signals. In some embodiments, the master oscillator 102 includes a fiber laser.

The PWG amplifier 104 receives the low-power optical signals from the master oscillator 102 and pump power. The PWG amplifier 104 generally operates to amplify the low-power optical signals and generate high-power optical signals. For example, the PWG amplifier 104 could amplify a low-power CW or other optical signal into a high-power CW or other optical signal having ten kilowatts of power or more. The received pump power provides the necessary population inversion in the PWG amplifier's gain medium for this amplification.

Figure 8:
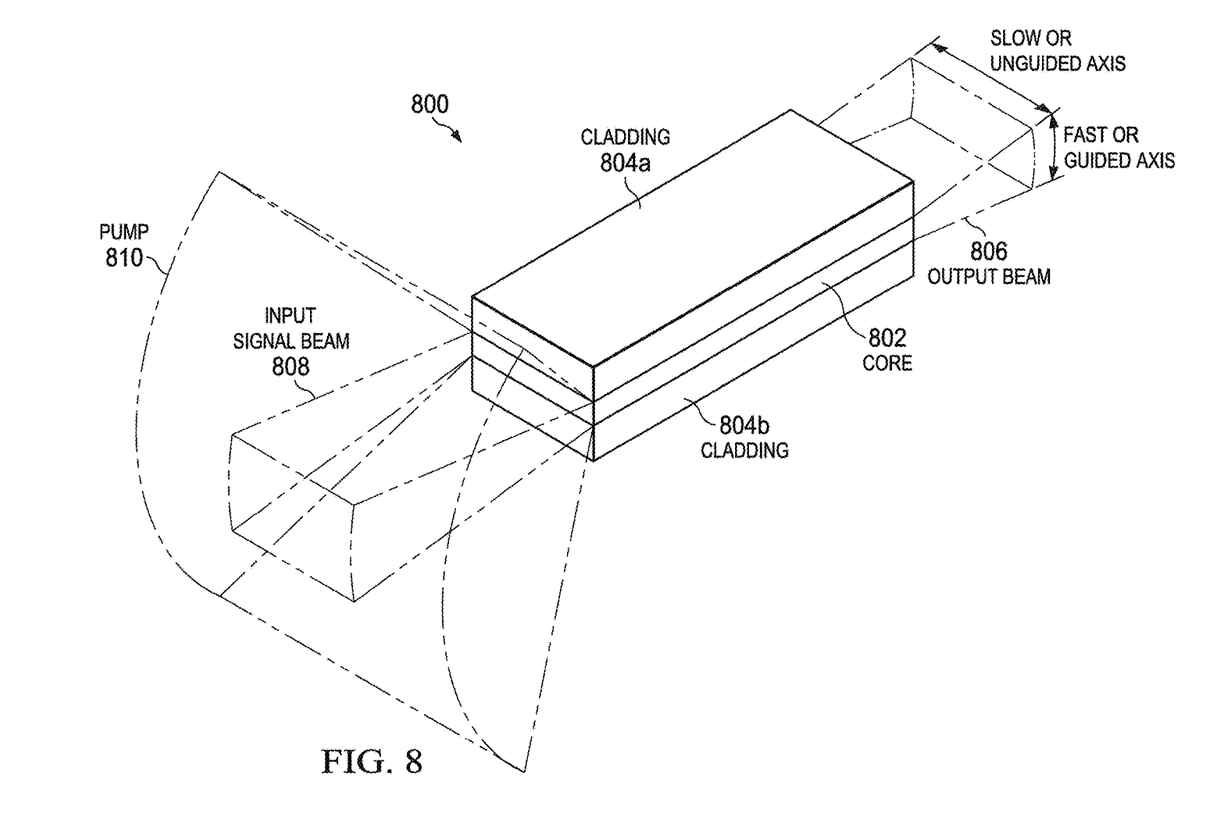
FIG. 8 illustrates an example planar waveguide for use in a high-power laser system according to this disclosure.

The gain medium of the PWG amplifier 104 is formed using a planar waveguide, an example of which is shown in FIG. 8. As shown in FIG. 8, a planar waveguide 800 generally denotes a structure that includes a core region 802 and one or more cladding layers 804*a*-804*b*. The core region 802 is doped with an active ion species responsive to optical signals of at least one specific wavelength, and the one or more cladding layers 804*a*-804*b* are optically transparent and contact the core region 802. A number of additional features, such as an anti-reflective coating on input or output face(s) of the cladding layers 804*a*-804*b*, could be used. A signal beam 808 from the master oscillator 102 is coupled into the core region 802 of the planar waveguide 800, and pumplight 810 is coupled into the core region 802 and/or one or more of the cladding layers 804*a*-804*b* to provide pump power for optical amplification that generates an output beam 806. The indexes of refraction and dielectric constants of the core region 802 and the cladding layer(s) 804*a*-804*b* differ and create boundaries that reflect the optical signals of the signal beam 808. The planar waveguide 800 therefore operates to guide the optical signals of the signal beam 808 in its narrower dimension (referred to as the "fast axis" or "guided axis" direction) but not in its broader dimension (referred to as the "slow axis" or "unguided axis" direction). The planar waveguide could be formed from any suitable materials and in any suitable manner.

Returning to FIG. 1, relay optics 106 direct the optical signals from the master oscillator 102 into a beam controller 108, and relay optics 110 direct the optical signals from the beam controller 108 into the PWG amplifier 104. The relay optics 106 and 110 can also alter the cross-sectional dimensions of the optical signals as needed for injection into the beam controller 108 and the PWG amplifier 104, respectively. Each of the relay optics 106 and 110 includes any suitable optical device(s) for directing or formatting optical signals.

The beam controller 108 generally operates to modify the optical signals from the master oscillator 102 before the optical signals reach the PWG amplifier 104. For example, the beam controller 108 could pre-distort the phase profile of the optical signals from the master oscillator 102 in order to substantially or completely compensate for optical phase distortions created within the PWG amplifier 104. The beam controller 108 could also pre-distort both the amplitude and phase of the optical signals from the master oscillator 102. The beam controller 108 could further include separate control devices for two-axis tip/tilt alignment control and higher-order beam control. The beam controller 108 includes any suitable structure(s) for pre-distorting or otherwise modifying optical signals in a controllable manner.

The high-power output beam generated by the PWG amplifier 104 is directed towards a beam splitter 112. The beam splitter 112 provides a substantial portion of the high-power output beam to relay optics 114, which provide that portion of the high-power output beam out of the laser system 100 as a high-power output beam 116. The beam splitter 112 also provides a small amount of the high-power output beam as samples to a feedback loop. The feedback loop is used to control and modify operation of the master oscillator 102, the PWG amplifier 104, and the beam controller 108. The beam splitter 112 includes any suitable structure(s) for splitting optical signals. The relay optics 114 include any suitable optical device(s) for directing or formatting optical signals.

The feedback loop here includes a diagnostics unit 118, a laser controller 120, and diode drivers 122-124. The diagnostics unit 118 generally operates to analyze the samples of the high-power output beam from the PWG amplifier 104. The diagnostics unit 118 includes any suitable structure(s) for identifying one or more characteristics of at least one sample of a high-power output beam. Example implementations of the diagnostics unit 118 are provided below.

The laser controller 120 uses data from the diagnostics unit 118 to determine how to adjust operation of the laser system 100. Various types of control strategies are described below for modifying the output of the master oscillator 102 using the beam controller 108. Note that while shown here as residing before the PWG amplifier 104, other or additional beam control functions could be located after the PWG amplifier 104 and controlled by the laser controller 120. The laser controller 120 can also respond to mode control commands from one or more external sources, such as control commands for initiating cooling or for initiating or ceasing laser action.

The laser controller 120 includes any suitable structure for controlling operation of a laser system. For example, the laser controller 120 could include one or more processing devices, such as one or more microprocessors, microcontrollers, digital signal processors, field programmable gate arrays, application specific integrated circuits, or discrete logic devices. The laser controller 120 could also include one or more memories configured to store instructions or data used, generated, or collected by the processing device(s). The laser controller 120 could further include one or more interfaces configured to facilitate communications with other components or systems.

The diode driver 122 generates electrical drive signals that cause one or more laser diodes (or other light sources) of the master oscillator 102 to generate optical pump power for the master oscillator 102, which causes the master oscillator 102 to generate desired low-power optical signals. The diode driver 124 generates electrical drive signals that cause laser diodes (or other light sources) of the PWG amplifier 104 to generate optical pump power for the PWG amplifier 104, which uses the pump power to provide optical amplification. The diode driver 124 could be capable of operation across a range of input voltages and load conditions while protecting expensive laser diode strings from electrical shorts and transients. Each diode driver 122-124 includes any suitable structure(s) for driving any suitable arrangement of laser diodes or other light sources.

In some embodiments, diagnostic data from the diagnostics unit 118 could be output by the laser controller 120, such as to one or more external destinations. This could allow the external destinations to monitor the health, status, or safety of the laser system 100. Also, in some embodiments, the laser controller 120 may run background and commanded built-in-test (BIT) routines to monitor the health, status, or safety of the laser system 100, predict the need for unscheduled maintenance, perform start-up sequencing, and/or shut the laser system 100 down if parameters are out of safety tolerance. Shutdown commands may also be received from an external source. In the event of a shutdown command, the laser controller 120 commands the master oscillator 102 and diode drivers 122-124 to turn off, and components such as fast reflective shutters may be used to divert residual laser power into a cooled beam dump (not shown).

As described in more detail below, the feedback loop in the system 100 can be used to pre-distort the phase of the low-power optical signals provided by the master oscillator 102 prior to the low-power optical signals being amplified by the PWG amplifier 104. Among other things, this can help to reduce or eliminate phase distortions created in the high-power output beam 116 by the PWG amplifier 104.

In conventional PWG amplifiers, the thickness of the core region in a planar waveguide is sufficiently small and the index of refraction difference between the core region and the cladding layer(s) is sufficiently small so that only low-order waveguide modes are allowed to propagate with low loss. This helps to maintain high beam quality for the master oscillator's signal beam in the fast axis direction of the PWG amplifier, regardless of thermal distortions in the PWG amplifier. By matching the master oscillator's signal mode to the lowest order waveguide mode, single mode operation in the fast axis of the PWG amplifier can be obtained.

Because of the design of conventional PWG amplifiers, however, there is no guiding or mode control in the transverse slow axis direction of the PWG amplifier. As a result, thermal distortions resulting from temperature differences across the slow axis of the PWG amplifier can create phase distortions in the signal beam across the slow axis as the signal beam traverses the length of the PWG amplifier. Such temperature differences may arise due to various reasons, such as (i) non-uniform pumping of the PWG amplifier, (ii) non-uniform stimulated emission extraction of energy deposited in the PWG amplifier by the pumping process, (iii) non-uniform extraction of energy via deleterious mechanisms such as amplified spontaneous emission (ASE) and parasitic lasing, (iv) non-uniform thermal contact resistance to cooling elements, and (v) thermal efficiency non-uniformities in the cooling elements.

In a high-power laser system having a MOPA architecture such as that shown in FIG. 1, the PWG amplifier 104 is used as a high optical gain amplifier in conjunction with a relatively low-power master oscillator 102. The master oscillator 102 generates a signal beam having very high beam quality, and the output of the PWG amplifier 104 can have a beam quality that is close to diffraction limited in the fast axis direction. However, depending on the severity of thermal effects in the PWG amplifier 104, without correction, the quality of the output beam 116 may be degraded in the slow axis direction of the PWG amplifier 104. This can pose problems for various applications, such as applications that seek to achieve a narrow beam divergence through a limited exit aperture or applications where the output beam 116 passes along a long Coudé path of limited cross section.

In accordance with this disclosure, the beam controller 108 can implement one-dimensional (1D) pre-distortion of the signal beam from the master oscillator 102. The relay optics 110 may image the signal beam from the beam controller 108 to the PWG amplifier 104. The pre-distortion is based on feedback provided by the diagnostics unit 118 to the laser controller 120. Ideally, the phase profile of the signal beam from the master oscillator 102 is pre-distorted so that, once phase distortions created by the PWG amplifier 104 occur, the high-power output beam 116 is substantially free from distortion.

The pre-distortion is referred to as "one-dimensional" here because the pre-distortion only needs to occur along one axis, namely the slow axis of the PWG amplifier 104 (across the broader dimension of the PWG amplifier 104). This pre-distortion could be achieved in any number of ways, examples of which are provided below. Because of the characteristics of the PWG amplifier 104, no correction may be needed in the fast axis direction of the PWG amplifier 104 (across the smaller dimension of the PWG amplifier 104). This can help to greatly simply the operation of the feedback loop in the laser system 100.

Examples and additional details regarding the use of the feedback loop in the laser system 100 are provided below. Note, however, that these examples and additional details are provided for illustration only. In general, a high-power laser system could incorporate any suitable feedback and provide any suitable 1D pre-distortion of a master oscillator's signal beam to compensate for thermal or other distortions created in a PWG amplifier.

Although FIG. 1 illustrates one example of a high-power laser system 100, various changes may be made to FIG. 1. For example, any number of each component could be used in the laser system 100. As a particular example, a series of PWG amplifiers 104 could be used, rather than a single PWG amplifier 104. While FIG. 8 illustrates one example of a planar waveguide 800 for use in a high-power laser system, various changes may be made to FIG. 8. For instance, the core region 802 need not be planar and could have a tapered shape, and/or the cladding layers 804a-804b need not be symmetrical.

Figure 2:
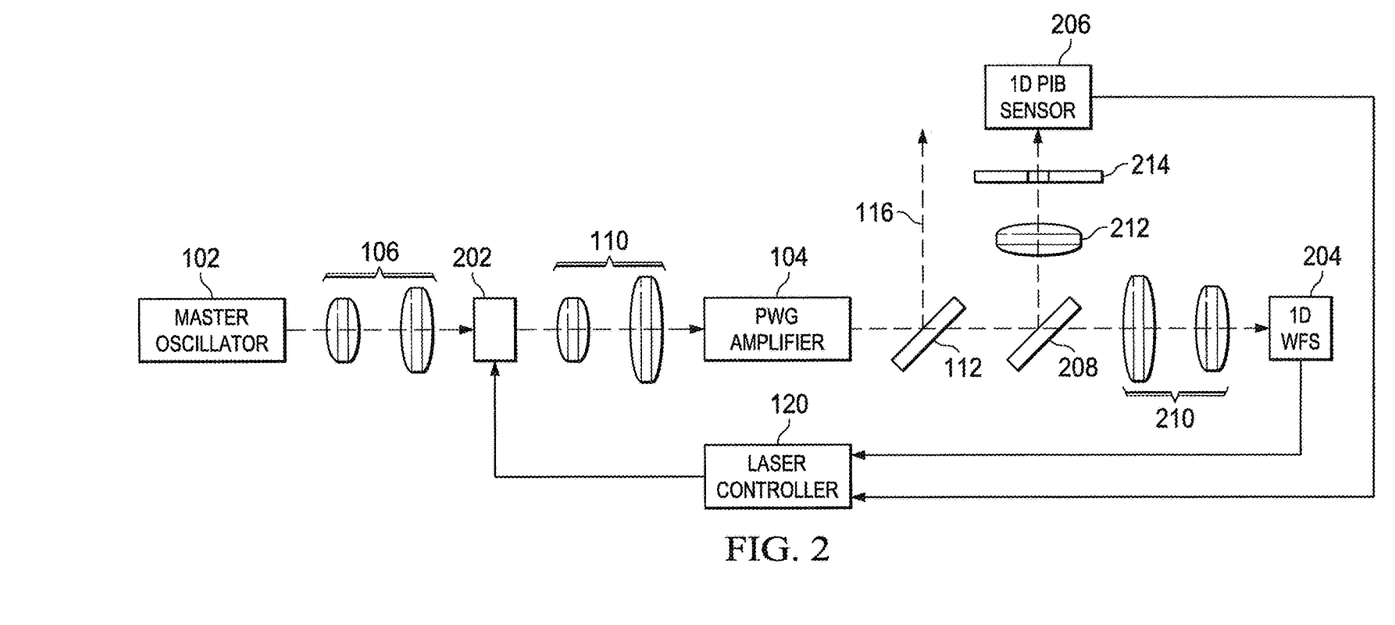
FIGS. 2 and 3 illustrate a first example technique for one-dimensional correction of phase distortions in a high-power laser system according to this disclosure.
Figure 3:
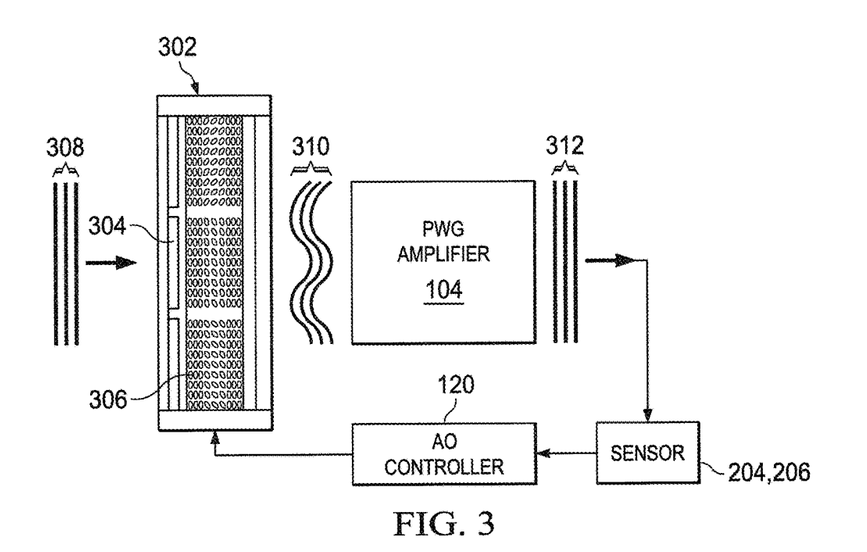

FIGS. 2 and 3 illustrate a first example technique for 1D correction of phase distortions in a high-power laser system according to this disclosure. In particular, FIG. 2 illustrates one example implementation of the laser system 100, and FIG. 3 illustrates example operation of this particular implementation of the laser system 100. Note that various components shown in FIG. 1 are omitted for simplicity in FIGS. 2 and 3.

As shown in FIG. 2, the beam controller 108 is implemented using a 1D adaptive optic 202. The adaptive optic 202 denotes any suitable structure(s) for modifying the phase of a signal beam from a master oscillator across one axis or in one direction. For example, the adaptive optic 202 could be used to modify the phase of the signal beam from the master oscillator 102 in the slow or unguided axis of the PWG amplifier 104. As particular examples, the adaptive optic 202 could include a 1D low-power deformable mirror, liquid crystal-based optical phased array (OPA), or other spatial light modulator. In these embodiments, the laser controller 120 could include a 1D adaptive optic processor configured to process measurements from one or more sensors in order to determine how to adjust the adaptive optic 202. In this manner, control of the adaptive optic 202 is in one dimension only, namely the slow axis of the PWG amplifier 104, and the adaptive optic processor only needs to provide correction commands in one dimension.

As described above, the beam splitter 112 provides samples of the high-power output beam 116 to the diagnostics unit 118. In this example, the diagnostics unit 118 includes a 1D wavefront sensor (WFS) 204 and/or a 1D power-in-the-bucket (PIB) sensor 206. When multiple sensors 204-206 are used, an additional beam splitter 208 can be used to divide the samples of the high-power output beam 116 into multiple sample signals for the sensors 204-206. Relay optics 210 can be used to focus or reformat one of the sample signals onto the sensor 204, and relay optics 212 can be used to focus or reformat another of the sample signals onto a slit structure 214.

The wavefront sensor 204 is configured to sense phase distortions in the samples of the high-power output beam 116 across the slow axis of the PWG amplifier 104. The wavefront sensor 204 outputs wavefront data to the laser controller 120, which uses the wavefront data in determining how to pre-distort the signal beam from the master oscillator 102. The wavefront sensor 204 includes any suitable structure(s) for measuring phase distortions. As a particular example, the wavefront sensor 204 could include a 1D Shack-Hartman sensor with a linear cylindrical lens array and a 1D semiconductor photodetector array. A Shack-Hartman sensor typically measures the tilt of a distorted phase front at several positions across a beam profile using a lens array to break the beam aperture into multiple sub-apertures, and photodetectors are located at the focus points of the sub-apertures to measure the displacement of the focal spots and hence derive the sub-aperture tilts. Other techniques and devices may be used for phase front sensing, such as interferometers and phase diversity receivers. The optics 210 can be used here to reimage the exit aperture of the PWG amplifier 104 onto the wavefront sensor 204. The optics 210 include any suitable optical device(s) for focusing or reformatting optical signals.

The PIB sensor 206 obtains a portion of the samples of the output beam 116 via the slit structure 214, helping to ensure that only a fraction of the portion of the beam profile that is of high beam quality is received. This portion is measured by the PIB sensor 206 to measure the "power in the bucket" (PIB), which denotes a far-field beam quality measurement of the high-power output beam 116. The PIB sensor 206 includes any suitable structure(s) for capturing far-field beam quality measurements, such as a single photodetector or a group of photodetectors. The optics 212 can be used here to focus the samples of the high-power output beam 116 onto the slit structure 214. The optics 212 include any suitable optical device(s) for focusing or reformatting optical signals. The slit structure 214 includes any suitable structure defining a slit through which light can pass.

Note that in this example, both the wavefront sensor 204 and the PIB sensor 206 (and their associated components) are used in the feedback loop. However, it is possible to omit the components 204 and 210 and use only the PIB sensor 206 and its associated components. Similarly, it is possible to omit the components 206 and 212-214 and use only the wavefront sensor 204 and its associated components. In those cases, the beam splitter 208 could be omitted or replaced with other optical devices, such as a mirror.

As shown in FIG. 3, the adaptive optic 202 can be implemented using an optical phased array 302, which includes multiple transparent pixels 304 and a liquid crystal 306. The transparent pixels 304 allow light to pass through selected portions of the optical phased array 302, while the liquid crystal 306 denotes a structure whose molecules can be reoriented as needed or desired to provide controllable distortion of the master oscillator's signal beam. Note, however, that the adaptive optic 202 could be implemented in any other suitable manner.

However the adaptive optic 202 is implemented, a pattern 308 in FIG. 3 denotes the wavefront pattern of the signal beam from the master oscillator 102. The pattern 308 here includes substantially straight perpendicular lines, indicating that the signal beam from the master oscillator 102 has a very high beam quality. A pattern 310 denotes the wavefront pattern of the signal beam from the master oscillator 102 after passing through the adaptive optic 202, and a pattern 312 denotes the wavefront pattern of the high-power output beam 116 generated by the PWG amplifier 104. The pattern 310 here shows substantial distortion of the wavefront pattern of the signal beam from the master oscillator 102 caused by the adaptive optic 202. However, the pattern 312 here shows little or no distortion, which indicates that the pre-distortion provided by the adaptive optic 202 substantially or completely compensates for the distortion caused by the PWG amplifier 104.

Figure 4:
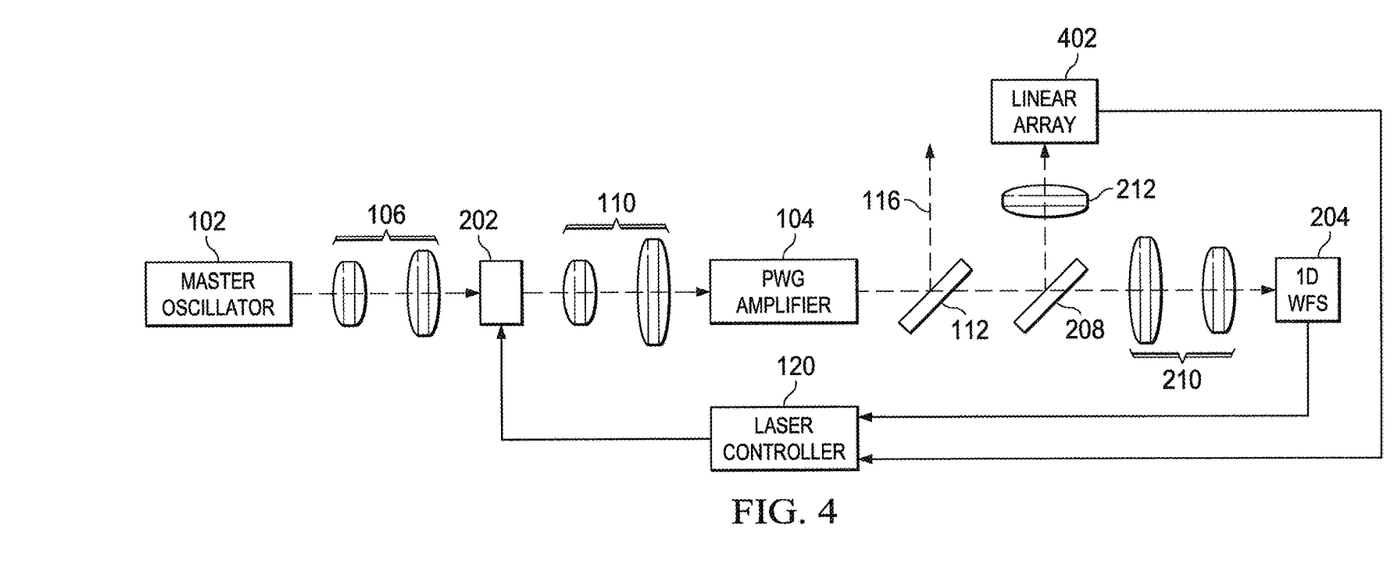
FIG. 4 illustrates a second example technique for one-dimensional correction of phase distortions in a high-power laser system according to this disclosure.

FIG. 4 illustrates a second example technique for 1D correction of phase distortions in a high-power laser system according to this disclosure. The approach shown in FIG. 4 is similar to the approach shown in FIG. 2. However, in FIG. 4, the PIB sensor 206 and the slit structure 214 have been replaced by a linear array 402. The linear array 402 denotes an array of imaging sensors that can measure the far-field beam profile at the output of the PWG amplifier 104. The linear array 402 can therefore be used to measure the PWG amplifier's exit beam profile in the slow axis of the PWG amplifier 104. The linear array 402 denotes any suitable structure(s) for imaging an optical beam or portion thereof.

Figure 5:
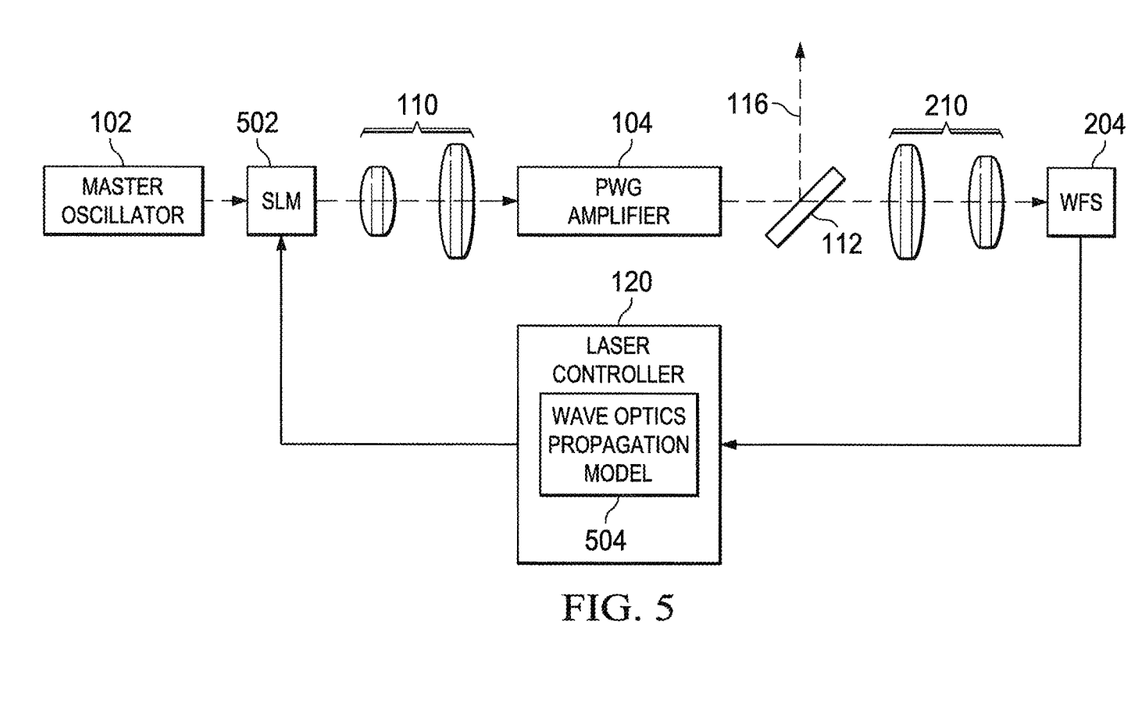
FIGS. 5 and 6 illustrate a third example technique for one-dimensional correction of phase distortions in a high-power laser system according to this disclosure.
Figure 6:
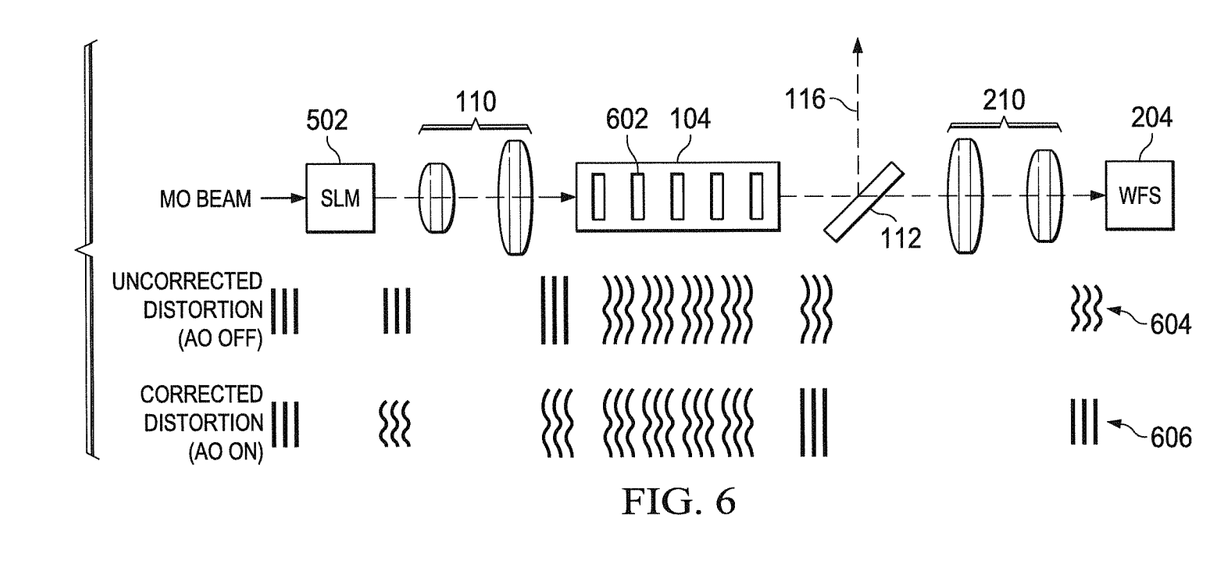

FIGS. 5 and 6 illustrate a third example technique for 1D correction of phase distortions in a high-power laser system according to this disclosure. In particular, FIG. 5 illustrates another example implementation of the laser system 100, and FIG. 6 illustrates example operation of this particular implementation of the laser system 100. Note that various components shown in FIG. 1 are omitted for simplicity in FIGS. 5 and 6.

As shown in FIG. 5, the beam controller 108 is implemented here using a spatial light modulator (SLM) 502, which denotes any suitable structure for spatially modulating light. Note, however, that any other suitable beam controller could be used to pre-distort the phase front of the signal beam from the master oscillator 102. Also, while relay optics 106 are not shown in FIG. 5, the laser system of FIG. 5 could include the relay optics 106 prior to the spatial light modulator 502. In addition, the laser system in FIG. 5 includes the wavefront sensor 204 and optics 210. While not shown, the laser system in FIG. 5 could also or alternatively include the PIB sensor 206, optics 212, and slit structure 214. Depending on the configuration, the beam splitter 208 may or may not be used.

The laser controller 120 in FIGS. 2, 4, and 5 processes wavefront, PIB, or other sensor information and sends control commands to a 1D beam control device within the beam controller 108. The beam control device could pre-distort the phase front of the master oscillator's signal beam in the slow axis direction to compensate for distortions created in the PWG amplifier 104. In some embodiments, the laser controller 120 determines the shape of the 1D phase front from wavefront sensor measurements and/or determines the beam quality based on far-field measurements from the PIB sensor 206 or linear array 402. The laser controller 120 derives control commands based on this information, and the control commands are input to the beam controller 108 to pre-distort the phase front of the master oscillator's signal beam.

Various algorithms can be used by the laser controller 120 to process the wavefront, PIB, or array measurements and generate control signals. For example, in some embodiments, the laser controller 120 uses wavefront sensor data to provide a fast, high bandwidth, low spatial order correction. In particular embodiments, this could be done by decomposing the wavefront data into 1D orthogonal polynomials, such as Legendre or Chebyschev polynomials, and applying a matrix multiplication process to the low-order terms to directly derive actuator commands for a 1D deformable mirror or other adaptive optic. The laser controller 120 could also use PIB or array measurements to provide a slow, low bandwidth, more accurate high spatial order correction. In particular embodiments, this could be done by successively applying different weights to the polynomial terms (possibly in a trial and error fashion) to improve far-field beam quality as the temporal evolution of the phase distortions trends to steady-state.

In some embodiments, the laser controller 120 could use the pre-distortion approaches described in U.S. Pat. No. 8,787,768 (which is hereby incorporated by reference). These techniques can be applied to spatial waveforms in order to enhance the performance of the algorithms described above that are based on 1D polynomial decompositions. These techniques also include mechanisms to "kick start" a pre-distortion process for a brief transient period after the master oscillator 102 first turns on and the PWG amplifier 104 is ramped to high gain. Additionally, an algorithm or look-up table may be used to accommodate a change in a waveform that occurs, such as due to deterministic thermal changes in the PWG lasing medium between the end of one engagement of the laser system 100 and the start of the subsequent engagement. In particular embodiments, the results of an algorithmic calculation or look-up table may include a set of coefficients and/or scaling parameters that are applied to the orthogonal polynomials described above.

The laser controller 120 in FIG. 5 also supports the use of one or more back-propagation algorithms to adjust the pre-distortion signal for improved wavefront correction at the output of the PWG amplifier 104. To support this functionality, the laser controller 120 includes at least one wave optics propagation model 504, which mathematically represents how light may become distorted within the PWG amplifier 104 and other components of the laser system 100. The laser controller 120 can use measurements from the wavefront sensor 204 to identify the shape of the distorted wavefront of the output beam 116. The laser controller 120 can then use the model(s) 504 to "back propagate" the distorted wavefront measured on the output side of the PWG amplifier 104 to the optical plane where the spatial light modulator 502 or other adaptive optic is located. The laser controller 120 uses this information in determining how the spatial light modulator 502 or other adaptive optic should pre-distort the master oscillator's signal beam.

Any suitable model 504 could be generated based on the PWG amplifier 104 and other components used in the laser system 100. For example, in some embodiments, phase distortions created by the PWG amplifier 104 are assumed to be evenly distributed along the length of the PWG amplifier 104. FIG. 6 shows an example of the back propagation process as a sequence of phase fronts within the PWG amplifier 104. The distortions are represented by a sequence of five phase sheets 602 (also known as phase screens) that are distributed evenly throughout the length of the PWG amplifier 104, although the PWG amplifier 104 could be represented using any number of phase sheets 602. The optical powers of the various relay optics are also represented by phase sheets, such as one for each lens element.

The back propagation process starts at the aperture of the wavefront sensor 204. Angular, wavelet, or other digital propagation routines can be used to calculate the change in amplitude and phase front from one phase sheet to the next. Care can be taken to use a sufficiently large array size to represent the phase sheets and propagating phase fronts to avoid aliasing near the edges of the beams. Patterns 604 denote the phase fronts of the beams without correction using an adaptive optic, while patterns 606 denote the phase fronts of the beams with correction using an adaptive optic calculated using the model 504.

Note that an even distribution of the phase sheets 602 in the PWG amplifier 104 is not required and that phase distortions may be modeled unevenly along the optical path through the PWG amplifier 104. For example, the phase screens 602 may be grouped more closely where thermal distortions are greatest, such as near the ends of the PWG amplifier 104 and/or in regions where the thermal gradients are highest in the PWG amplifier 104. The areas of greatest thermal distortion could be identified in any suitable manner, such as through finite element thermal analysis of the PWG amplifier 104 under specified optical pumping and laser power extraction conditions, using thermography of the PWG amplifier 104 during actual operation, or using some other thermal analysis technique.

Although FIGS. 2 through 6 illustrate various examples of techniques for one-dimensional correction of phase distortions in a high-power laser system and related details, various changes may be made to FIGS. 2 through 6. For example, any combination of features in these figures could be used together, such as when features in one or more of these figures are used in others of these figures. Also, the examples shown in FIGS. 3 and 6 are for illustration only, and various other corrections could occur in the laser systems described above.

The various approaches described above support the use of a 1D adaptive optic located between the master oscillator 102 and the PWG amplifier 104 in a high-power MOPA architecture to improve or optimize the output beam quality. Since the PWG amplifier 104 distorts the beam substantially along a single axis, adaptive optic correction may be needed only along that one axis, which can greatly simplify the correction.

Moreover, placing the adaptive optic in the low power path between the master oscillator 102 and the PWG amplifier 104, rather than in the high-power output beam path, greatly reduces the power incident on the adaptive optic. This enables a larger selection of adaptive optic types since many adaptive optics could not be used in the high-power output beam's path. This can be particularly beneficial since some types of adaptive optics having lower power-handling limits, such as liquid crystal spatial light modulators, can achieve much higher actuator resolutions and have better capabilities compared with typical high-power adaptive optics such as deformable mirrors. However, nothing prevents elements such as deformable mirrors from being used in the laser system 100. The use of a 1D adaptive optic also enables a higher actuator count for improved correction without requiring an unreasonably high number of control channels. This is because the number of control channels scales linearly with the number of actuators across the beam width, rather than with the square of the number of actuators as in two-dimensional (2D) adaptive optics.

In addition, since the adaptive optic can be positioned prior to the PWG amplifier 104 on the low-power side and modified based on sensor measurements taken on the high-power side, the high gain of the PWG amplifier 104 allows for correction of the low-power beam, reducing the cost and complexity of the beam control device. Finally, wavefront distortions due to pumping and cooling non-uniformities in the PWG amplifier 104 at a given power level are generally quasi-static, so various lower-bandwidth optimization-based control algorithms can be effectively employed, and the non-uniformities are correctable within the bandwidth and actuator spacing of a 1D beam controller.

Note that the term "one-dimensional" in this patent document merely indicates that measurements or actuator actions occur substantially along a single axis or direction. Nothing prevents a multi-dimensional sensor from being used in a laser system to capture measurements along a single axis, and nothing prevents multi-dimensional adaptive optics from being used in a laser system to pre-distort a low-power optical beam along a single axis. Also, it is possible that pre-distortions made along the slow axis could conceivably have a slight impact on operation of the PWG amplifier 104 along the fast axis. However, this impact could be insignificant and ignored during control operations of the laser controller 120.

Figure 7:
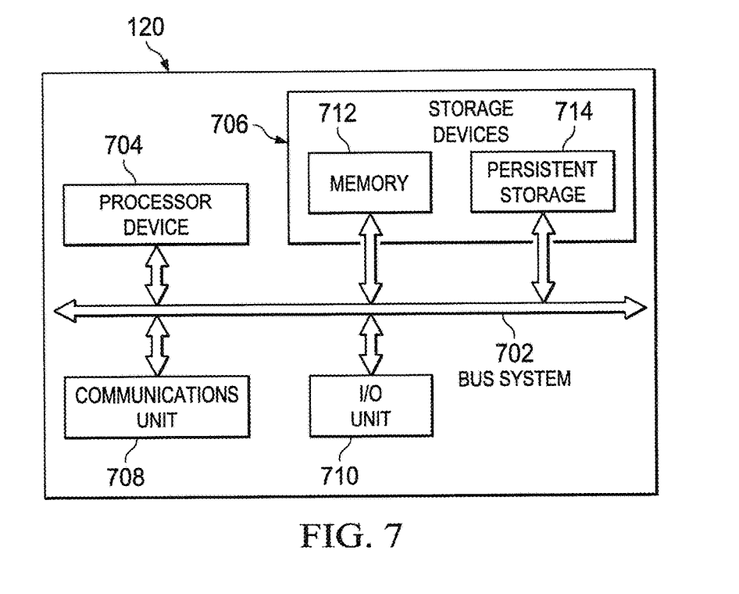
FIG. 7 illustrates an example laser controller supporting one-dimensional correction of phase distortions in a high-power laser system according to this disclosure.

FIG. 7 illustrates an example laser controller 120 supporting one-dimensional correction of phase distortions in a high-power laser system according to this disclosure. As shown in FIG. 7, the laser controller 120 includes a bus system 702, which supports communication between at least one processing device 704, at least one storage device 706, at least one communications unit 708, and at least one input/output (I/O) unit 710.

The processing device 704 executes instructions that may be loaded into a memory 712. The instructions could support any suitable functions of the laser controller 120, such as adaptive optic control, back propagation calculation, and/or other functions described above. The processing device 704 may include any suitable number(s) and type(s) of processors or other computing devices in any suitable arrangement. Example types of processing devices 704 include microprocessors, microcontrollers, digital signal processors, field programmable gate arrays, application specific integrated circuits, and discrete circuitry.

The memory 712 and a persistent storage 714 are examples of storage devices 706, which represent any structure(s) capable of storing and facilitating retrieval of information (such as data, program code, and/or other suitable information on a temporary or permanent basis). The memory 712 may represent a random access memory or any other suitable volatile or non-volatile storage device(s). The persistent storage 714 may contain one or more components or devices supporting longer-term storage of data, such as a read only memory, hard drive, Flash memory, or optical disc.

The communications unit 708 supports communications with other systems or devices. For example, the communications unit 708 could include a network interface card or a wireless transceiver facilitating communications with the sensors 204-206, beam controller 108, and diode drivers 122-124. The communications unit 708 may support communications through any suitable physical or wireless communication link(s).

The I/O unit 710 allows for input and output of data. For example, the I/O unit 710 may provide a connection for user input through a keyboard, mouse, keypad, touchscreen, or other suitable input device. The I/O unit 710 may also send output to a display, printer, or other suitable output device.

Although FIG. 7 illustrates one example of a laser controller 120 supporting one-dimensional correction of phase distortions in a high-power laser system, various changes may be made to FIG. 7. For example, various components in FIG. 7 could be combined, further subdivided, or omitted and additional components could be added according to particular needs. Also, computing devices can come in a wide variety of configurations, and FIG. 7 does not limit this disclosure to any particular laser controller.

High-power laser systems, such as the ones described above, could be used in a large number of military and commercial applications. The following discussion provides a description of various example commercial applications. However, the following discussion does not limit this disclosure to any particular applications.

High-power laser systems could find use in commercial mining applications, such as in drilling, mining, or coring operations. For instance, high-power laser systems could be used to soften or weaken an earth bed prior to drilling through the earth bed using drill bits. This could allow for fewer drill bit changes and extended lifetimes and reliabilities of the drill bits. Here, free-space propagation of a high-power laser beam from an output window of a laser system could be used, allowing deeper penetration at further distances compared to conventional fiber lasers.

High-power and high-beam quality laser systems could also find use in remote laser welding, cutting, drilling, or heat treating operations, such as in industrial or other automation settings. The use of a high-power and high-beam quality laser system allows the processing of thicker materials to occur at larger working distances from the laser system while minimizing the heat-affected zone and maintaining vertical or other cut lines. Among other things, this helps to support welding or cutting operations where proximity to the weld or cut site is difficult or hazardous. It also helps to protect the laser system and possibly any human operators from smoke, debris, or other harmful materials.

High-power laser systems could further find use in construction and demolition operations. Example operations could include metal resurfacing or deslagging, paint removal, and industrial demolition operations. High-power laser systems can be used to ablate material much faster and safer compared to conventional operations. As a particular example of this functionality, high-power laser systems could be used to support demolition of nuclear reactors or other hazardous structures. Here, the high-power laser systems could be used to cut through contaminated structures like contaminated concrete or nuclear containment vessels or reactors from long distances. This helps to avoid the use of water jet cutting or other techniques that create hazardous waste, such as contaminated water. It also provides improved safety since human operators can remain farther away from contaminated structures being demolished.

A number of additional applications are possible. For example, high-power laser systems could find use in power beaming applications, where high-power laser beams are targeted to photovoltaic (solar) cells of remote devices to be recharged. High-power laser systems could find use in hazardous material (HAZMAT) applications, where the laser systems are used to heat and decompose hazardous materials into less harmful or non-harmful materials.

Note that in the above description, the use of 1D pre-distortion of the signal beam from the master oscillator 102 has been described, and various techniques for 1D correction of phase distortions have been disclosed. However, it is also possible to implement multi-dimensional pre-distortion of the signal beam from the master oscillator 102, and various techniques for multi-dimensional correction of phase distortions could be implemented in a system in the same locations described above. Such multi-dimensional correction could occur using a deformable mirror, an optical phased array, a spatial light modulator, or other suitable multi-dimensional device. Also, such multi-dimensional correction could occur using suitably-modified control algorithm(s) executed by the laser controller 120 or other suitable component(s). The control algorithm(s) could operate using the same data described above, such as wavefront, PIB, array measurements, or other data.

The following describes example features and implementations of a PWG amplifier-based laser system and related components according to this disclosure. However, other features and implementations of a PWG amplifier-based laser system and related components could be used.

In a first embodiment, a system includes a master oscillator configured to generate a low-power optical beam. The system also includes a PWG amplifier configured to amplify the low-power beam into a high-power output optical beam, where the PWG amplifier has a larger dimension in an unguided direction and a smaller dimension in a transverse guided direction. The system further includes an adaptive optic configured to pre-distort the low-power optical beam substantially along a single dimension prior to injection of the low-power optical beam into the PWG amplifier in order to compensate for thermal-based distortions created by the PWG amplifier. The single dimension represents the unguided direction. In addition, the system includes a feedback loop configured to control the adaptive optic.

Any single one or any combination of the following features could be used with the first embodiment. The adaptive optic may be located in an optical path of the low-power optical beam between the master oscillator and the PWG amplifier. The adaptive optic may include at least one of a deformable mirror, an optical phased array, and a spatial light modulator. The feedback loop may include at least one of a wavefront sensor configured to measure phase distortions of samples of the high-power output optical beam along the single dimension, a power-in-the-bucket sensor configured to measure beam quality of the high-power output optical beam using the samples of the high-power output optical beam, and an array of imaging sensors configured to measure a far-field beam profile of the high-power output optical beam using the samples of the high-power output optical beam. The feedback loop may also include a laser controller configured to control the adaptive optic based on at least one of the measured phase distortions, the measured beam quality, and the measured far-field beam profile. The laser controller may be configured to use the measured phase distortions to control the adaptive optic in order to effect high-bandwidth, low-order phase front correction and use at least one of the measured beam quality and the measured far-field beam profile to control the adaptive optic in order to effect low-bandwidth, high-order phase front correction. The feedback loop may include a laser controller configured to control the adaptive optic using at least one propagation model, and the laser controller may be configured to use the at least one propagation model to back propagate phase distortions measured by the feedback loop to the adaptive optic. The at least one propagation model may evenly distribute phase distortions along a length of the PWG amplifier. The at least one propagation model may unevenly distribute phase distortions along a length of the PWG amplifier based on thermal analysis of the PWG amplifier.

In a second embodiment, a method incudes generating a low-power optical beam using a master oscillator. The method also includes amplifying the low-power optical beam to generate a high-power output optical beam using a PWG amplifier, where the PWG amplifier has a larger dimension in an unguided direction and a smaller dimension in a transverse guided direction. The method further includes controlling an adaptive optic using a feedback loop to pre-distort the low-power optical beam substantially along a single dimension prior to injection of the low-power optical beam into the PWG amplifier in order to compensate for thermal-based distortions created by the PWG amplifier. The single dimension represents the unguided direction.

Any single one or any combination of the following features could be used with the second embodiment. The adaptive optic may be located in an optical path of the low-power optical beam between the master oscillator and the PWG amplifier. The adaptive optic may include at least one of a deformable mirror, an optical phased array, and a spatial light modulator. Controlling the adaptive optic may include using at least one of phase distortions of samples of the high-power output optical beam along the single dimension measured by a wavefront sensor, beam quality of the high-power output optical beam using the samples of the high-power output optical beam measured by a power-in-the-bucket sensor, and a far-field beam profile of the high-power output optical beam using the samples of the high-power output optical beam measured by an array of imaging sensors. Controlling the adaptive optic may also include controlling the adaptive optic in order to effect high-bandwidth, low-order phase front correction based on the measured phase distortions and controlling the adaptive optic in order to effect low-bandwidth, high-order phase front correction based on at least one of the measured beam quality and the measured far-field beam profile. Controlling the adaptive optic may include using at least one propagation model to back propagate phase distortions measured by the feedback loop to the adaptive optic. The at least one propagation model may evenly distribute phase distortions along a length of the PWG amplifier. The at least one propagation model may unevenly distribute phase distortions along a length of the PWG amplifier based on thermal analysis of the PWG amplifier.

In a third embodiment, an apparatus includes at least one interface configured to receive measurements of samples of a high-power output optical beam generated by a PWG amplifier amplifying a low-power optical beam from a master oscillator. The PWG amplifier has a larger dimension in an unguided direction and a smaller dimension in a transverse guided direction. The apparatus also includes at least one processing device configured to control an adaptive optic located in an optical path of the low-power optical beam between the master oscillator and the PWG amplifier using the measurements. The at least one processing device is configured to determine how to adjust the adaptive optic in order to pre-distort the low-power optical beam substantially along a single dimension prior to injection of the low-power optical beam into the PWG amplifier in order to compensate for thermal-based distortions created by the PWG amplifier. The single dimension represents the unguided direction.

Any single one or any combination of the following features could be used with the third embodiment. The at least one processing device may be configured to determine how to adjust the adaptive optic using at least one propagation model, and the at least one processing device may be configured to use the at least one propagation model to back propagate phase distortions identified by the measurements to the adaptive optic. The at least one propagation model may evenly distribute phase distortions along a length of the PWG amplifier. The at least one propagation model may unevenly distribute phase distortions along a length of the PWG amplifier based on thermal analysis of the PWG amplifier.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
    a master oscillator configured to generate a low-power optical beam;
    a planar waveguide (PWG) amplifier configured to amplify the low-power beam into a high-power output optical beam, the PWG amplifier having a larger dimension in an unguided direction and a smaller dimension in a transverse guided direction;
    an adaptive optic configured to pre-distort the low-power optical beam substantially along a single dimension prior to injection of the low-power optical beam into the PWG amplifier in order to compensate for thermal-based distortions created by the PWG amplifier, the single dimension representing the unguided direction; and
    a feedback loop configured to control the adaptive optic, the feedback loop comprising a laser controller configured to provide corrective commands to the adaptive optic in the single dimension.

2. The system of claim 1, wherein the adaptive optic is located in an optical path of the low-power optical beam between the master oscillator and the PWG amplifier.

3. The system of claim 1, wherein the adaptive optic comprises at least one of: a deformable mirror, an optical phased array, and a spatial light modulator.

4. The system of claim 1, wherein the feedback loop comprises at least one of:
    a wavefront sensor configured to measure phase distortions of samples of the high-power output optical beam along the single dimension;
    a power-in-the-bucket sensor configured to measure beam quality of the high-power output optical beam using the samples of the high-power output optical beam; and
    an array of imaging sensors configured to measure a far-field beam profile of the high-power output optical beam using the samples of the high-power output optical beam.

5. The system of claim 4, wherein
    the laser controller is configured to control the adaptive optic based on at least one of: the measured phase distortions, the measured beam quality, and the measured far-field beam profile.

6. The system of claim 5, wherein the laser controller is configured to:
    use the measured phase distortions to control the adaptive optic in order to effect high-bandwidth, low-order phase front correction; and
    use at least one of the measured beam quality and the measured far-field beam profile to control the adaptive optic in order to effect low-bandwidth, high-order phase front correction.

7. The system of claim 1, wherein the laser controller is configured to control the adaptive optic using at least one propagation model, the laser controller configured to use the at least one propagation model to back propagate phase distortions measured by the feedback loop to the adaptive optic.

8. The system of claim 7, wherein the at least one propagation model evenly distributes phase distortions along a length of the PWG amplifier.

9. The system of claim 7, wherein the at least one propagation model unevenly distributes phase distortions along a length of the PWG amplifier based on thermal analysis of the PWG amplifier.

10. A method comprising:
    generating a low-power optical beam using a master oscillator;

amplifying the low-power optical beam to generate a high-power output optical beam using a planar waveguide (PWG) amplifier, the PWG amplifier having a larger dimension in an unguided direction and a smaller dimension in a transverse guided direction; and controlling an adaptive optic using a feedback loop by providing corrective commands to the adaptive optic in a single dimension to pre-distort the low-power optical beam substantially along the single dimension prior to injection of the low-power optical beam into the PWG amplifier in order to compensate for thermal-based distortions created by the PWG amplifier, the single dimension representing the unguided direction.

11. The method of claim 10, wherein the adaptive optic is located in an optical path of the low-power optical beam between the master oscillator and the PWG amplifier.

12. The method of claim 10, wherein the adaptive optic comprises at least one of: a deformable mirror, an optical phased array, and a spatial light modulator.

13. The method of claim 10, wherein controlling the adaptive optic comprises using at least one of:
  phase distortions of samples of the high-power output optical beam along the single dimension measured by a wavefront sensor;
  beam quality of the high-power output optical beam using the samples of the high-power output optical beam measured by a power-in-the-bucket sensor; and
  a far-field beam profile of the high-power output optical beam using the samples of the high-power output optical beam measured by an array of imaging sensors.

14. The method of claim 13, wherein controlling the adaptive optic further comprises:
  based on the measured phase distortions, controlling the adaptive optic in order to effect high-bandwidth, low-order phase front correction; and
  based on at least one of the measured beam quality and the measured far-field beam profile, controlling the adaptive optic in order to effect low-bandwidth, high-order phase front correction.

15. The method of claim 10, wherein controlling the adaptive optic comprises:
  using at least one propagation model to back propagate phase distortions measured by the feedback loop to the adaptive optic.

16. The method of claim 15, wherein the at least one propagation model evenly distributes phase distortions along a length of the PWG amplifier.

17. The method of claim 15, wherein the at least one propagation model unevenly distributes phase distortions along a length of the PWG amplifier based on thermal analysis of the PWG amplifier.

18. An apparatus comprising:
  at least one interface configured to receive measurements of samples of a high-power output optical beam generated by a planar waveguide (PWG) amplifier amplifying a low-power optical beam from a master oscillator, the PWG amplifier having a larger dimension in an unguided direction and a smaller dimension in a transverse guided direction; and
  at least one processing device configured to control an adaptive optic located in an optical path of the low-power optical beam between the master oscillator and the PWG amplifier using the measurements, the at least one processing device configured to determine how to adjust the adaptive optic in order to pre-distort the low-power optical beam substantially along a single dimension prior to injection of the low-power optical beam into the PWG amplifier in order to compensate for thermal-based distortions created by the PWG amplifier, the single dimension representing the unguided direction, the at least one processing device configured to provide corrective commands to the adaptive optic in the single dimension.

19. The apparatus of claim 18, wherein the at least one processing device is configured to determine how to adjust the adaptive optic using at least one propagation model, the at least one processing device configured to use the at least one propagation model to back propagate phase distortions identified by the measurements to the adaptive optic.

20. The apparatus of claim 19, wherein the at least one propagation model evenly distributes phase distortions along a length of the PWG amplifier.

21. The apparatus of claim 19, wherein the at least one propagation model unevenly distributes phase distortions along a length of the PWG amplifier based on thermal analysis of the PWG amplifier.

22. The system of claim 1, wherein the PWG amplifier propagates only low-order waveguide modes with low loss.

* * * * *